J. STICKLEY.
WIRELESS CORN PLANTER.
APPLICATION FILED JULY 9, 1909.

950,682.

Patented Mar. 1, 1910.
4 SHEETS—SHEET 1.

Witnesses

Inventor
Joseph Stickley.
By C.A. Snow & Co.
Attorneys.

J. STICKLEY.
WIRELESS CORN PLANTER.
APPLICATION FILED JULY 9, 1909.

950,682.

Patented Mar. 1, 1910.
4 SHEETS—SHEET 4.

Witnesses

Inventor
Joseph Stickley
By C A Snow & Co.
Attorneys

UNITED STATES PATENT OFFICE.

JOSEPH STICKLEY, OF LAKE ANDES, SOUTH DAKOTA, ASSIGNOR OF ONE-HALF TO WILLIAM MOORE, OF ARMOUR, SOUTH DAKOTA.

WIRELESS CORN-PLANTER.

950,682. Specification of Letters Patent. Patented Mar. 1, 1910.

Application filed July 9, 1909. Serial No. 506,789.

*To all whom it may concern:*

Be it known that I, JOSEPH STICKLEY, a citizen of the United States, residing at Lake Andes, in the county of Charles Mix and State of South Dakota, have invented a new and useful Wireless Corn-Planter, of which the following is a specification.

This invention has relation to planters of the check-row type, which is adapted to be automatically operated for properly depositing the seed without the use of the usual wire, with buttons or knots for operating the dropping mechanism.

The planter comprises a wheel-mounted main frame, upon which is slidably mounted a frame which carries the seed separating and dropping mechanism. Means is provided for raising and lowering the said secondary frame, and means is provided for transmitting movement from the supporting traction wheels of the main frame to the seed-dropping mechanism, irrespective of the relative position of the secondary frame with the main frame. Also, means is provided upon the main frame for advancing the stage of operation of the seed-dropping mechanism, in order that the seed may be dropped in a row in transverse alinement with seed previously deposited in other rows, so that true and accurate check rows may be produced.

Figure 1:
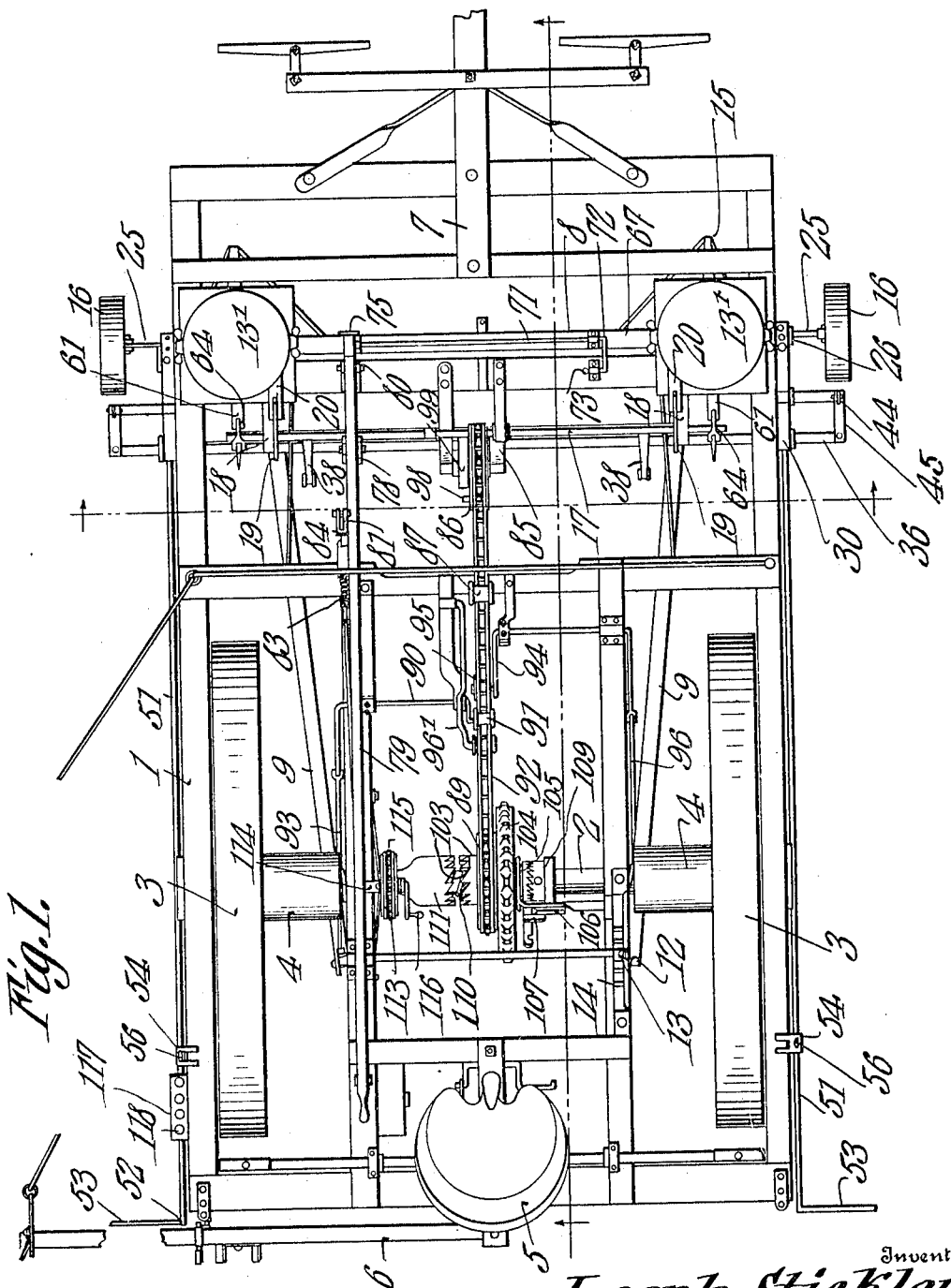
Figure 2:
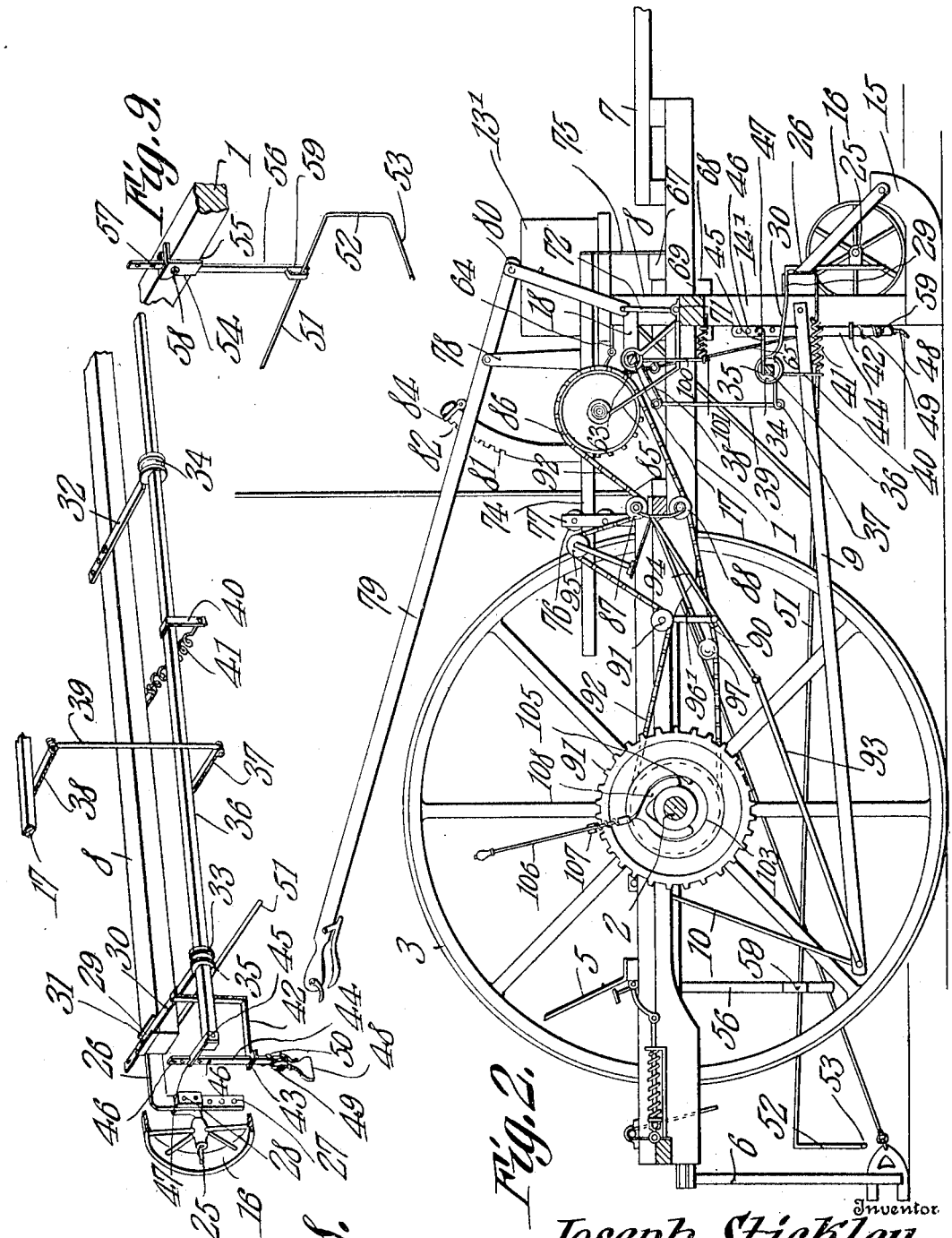
Figure 3:
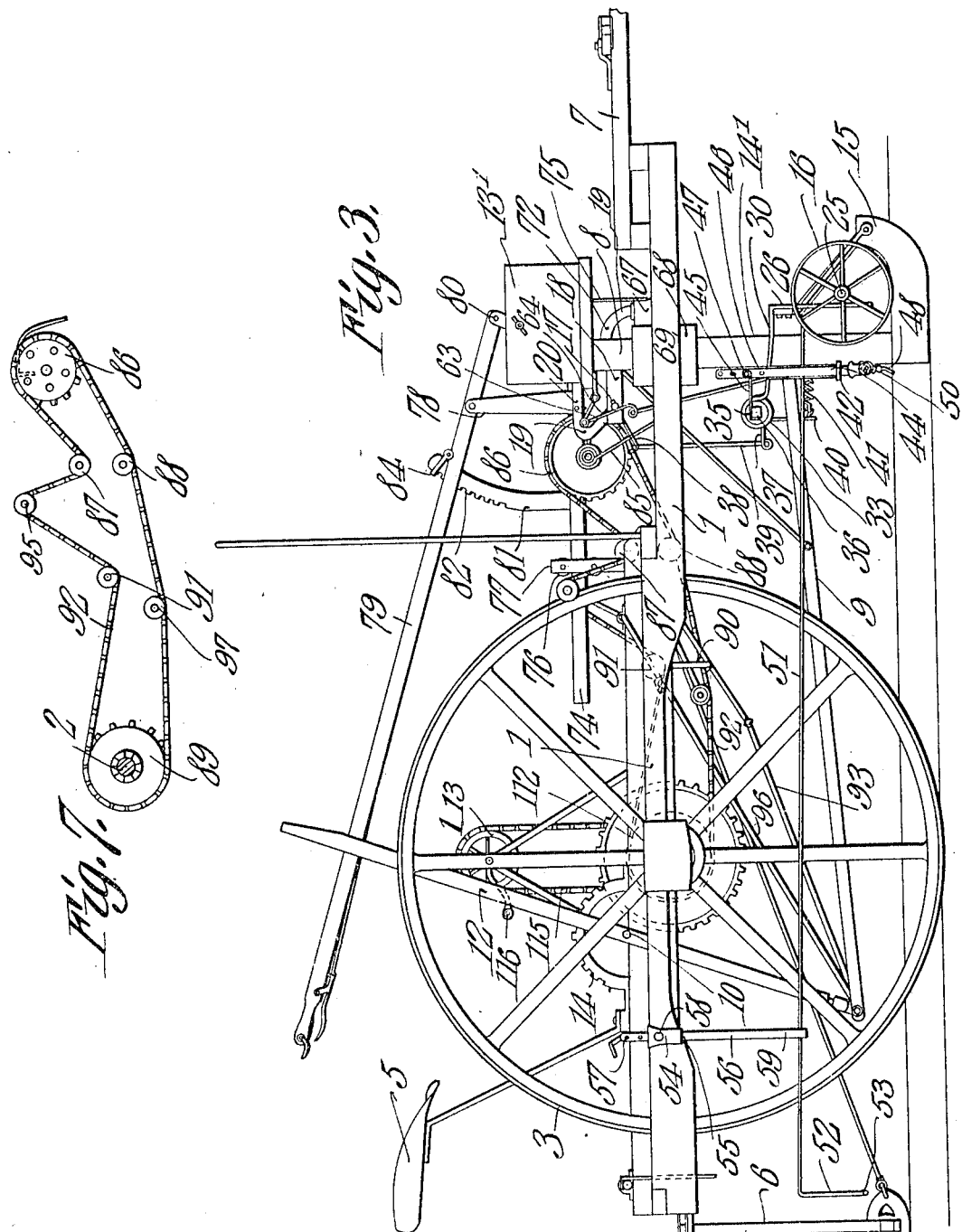
Figure 4:
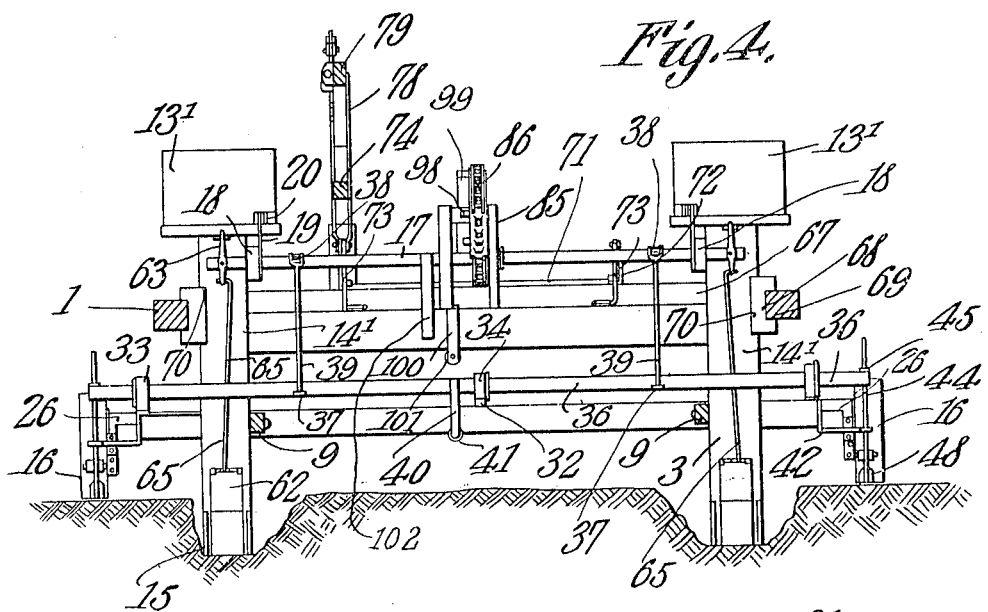
Figures 5, 6:
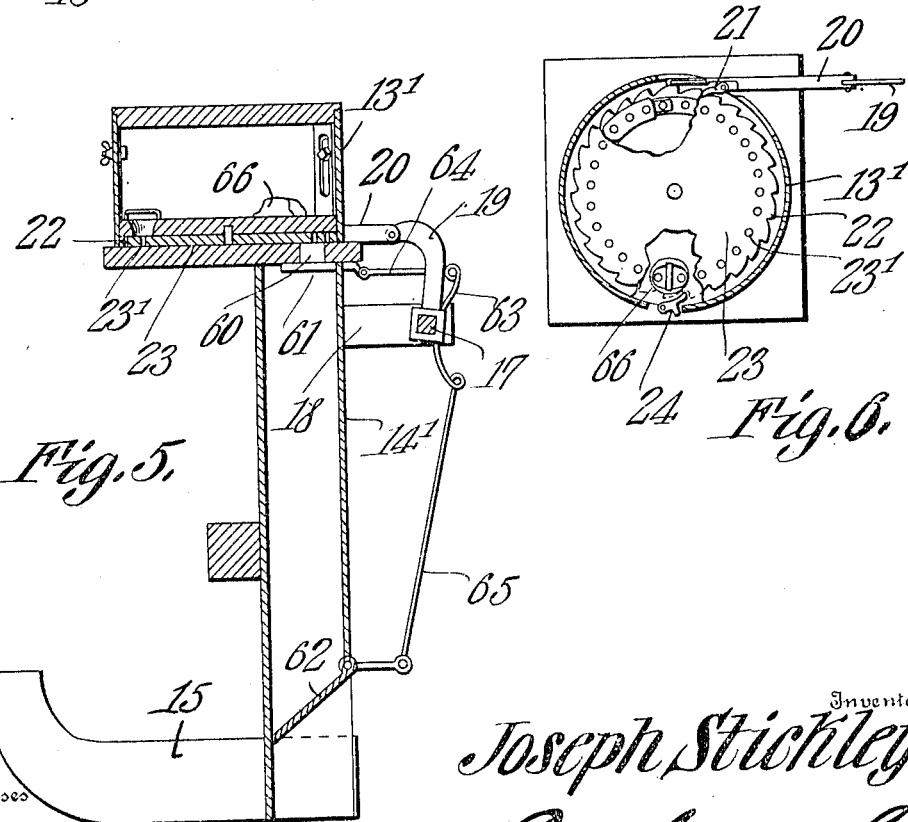

In the accompanying drawings:—Figure 1 is a top plan view of the planter. Fig. 2 is a vertical longitudinal sectional view of the same. Fig. 3 is a side elevation of the same. Fig. 4 is a transverse sectional view of the same. Fig. 5 is a vertical sectional view of one of the seed boxes and chutes used upon the planter. Fig. 6 is a horizontal sectional view of one of the seed boxes. Fig. 7 is a side elevation of a chain drive mechanism used upon the planter. Fig. 8 is a perspective view of a marker and adjacent parts used upon the planter. Fig. 9 is a perspective view of a support for the rear portion of an indicator rod used upon the planter.

The planter includes a main or primary frame 1, upon which is journaled an axle 2. Traction wheels 3 are mounted upon the end portions of the axle 2 and are provided in their hubs with pawl and ratchet escapement devices 4, of usual structure not shown, through which rotary movement is transmitted from the traction wheels to the said axle when the wheels turn in a forward direction, but which permit the axle to remain at rest when the wheels turn rearwardly.

An operator's seat 5 is mounted upon the frame 1, and a marker 6 is pivotally connected with the rear end of the said frame. A draft tongue 7, of usual construction, is attached to the forward portion of the frame 1.

A secondary frame 8 is slidably mounted upon the forward portion of the frame 1, and is also susceptible of being vertically adjusted with relation thereto. The secondary frame 8 includes rearwardly disposed arms 9, which are pivotally connected with the ends of a U-shaped shaft 10, which, in turn, is journaled upon the primary frame 1. A lever 12 is rigidly attached to one of the ends of the shaft 10, and, when swung, is adapted to turn the said shaft upon its axis. The said lever is provided with a pawl 13, which is adapted to engage the teeth of a segment 14, which is mounted upon the primary frame 1. By the lever and shaft mechanism, as shown and described, it will be seen that means is provided for moving the secondary frame forward or back upon the primary frame 1.

The secondary frame 8 carries seed-boxes 13′, from which depend chutes 14′. Shoes or furrow openers 15 are attached to the frame 8 and are located below the delivery ends of the chutes 14′. Wheels 16 are journaled at the opposite sides of the secondary frame 8, and are adapted to travel upon the surface of the ground and sustain the weight of the said secondary frame and its attachments.

The wheels 16 have broad peripheries or tires, and are located beyond the paths in which the traction wheels 3 travel. A shaft 17 is journaled in brackets 18 carried by the frame 8 and is located behind the seed boxes 13′. Arms 19 are fixed to the shaft 17, and, at their upper ends, are pivotally connected with bars 20, which are slidably mounted in the lower portions of the seed boxes 13′. The bars 20 carry pawls 21, which are adapted to engage the teeth of disks 23, which are journaled for rotation in the bottoms of the seed boxes 13′. The disks 23 are provided with seed-receiving perforations 23′, and a pawl 24 is pivoted in each seed box 13′ and is adapted to engage the teeth 22 of the disks and prevent the said disks from rotating in the direction opposite from that in which they are rotated through the instrumentality of the reciprocating bars 20 and their attached pawls.

The wheels 16 are journaled on spindles 25 which, in turn, are adjustably attached to brackets 26, carried by the frame 8. Each bracket 26 is provided with a series of perforations 27, which are adapted to receive bolts 28 which also pass transversely through the shank of the spindle 25. The frame 8 is provided with guides 29, which receive the forward ends of arms 30. The said arms are adjustably secured in the said guides by means of screws or bolts 31, and the arms 30 are located at the end portions of the frame 8, while an intermediate arm 32 is located at a point intermediate of the ends of the said frame 8. The arms 30 are provided at their rear ends with bearings 33, while the arm 32 is provided at its rear end with a bearing 34. Bushings 35 are journaled in the bearings 33 and 34, and receive a non-circular shaft 36. A rearwardly extending arm 37 is fixed at its forward end to the shaft 36, and a rearwardly extending arm 38 is fixed at its forward end to the shaft 17. The arms 37 and 38 may be duplicated if desired. A rod 39 is pivotally connected at its lower end with one of the arms 37 and is pivotally connected at its upper end with the arm 38. A downwardly disposed arm 40 is fixed to the shaft 36 at a point intermediate of the ends thereof, and a coil spring 41 is connected at one end with the lower portion of the arm 40, and at its other end with the intermediate portion of the frame 8. The spring 41 is under tension with a tendency to hold the lower end of the arm 40 toward the frame 8.

A bracket 42 is attached to each of the arms 30, and each bracket 42 is provided with a guide slot 43. Vertically disposed bars 44 are located in the guide slots 43, and arms 45 are fixed to the end portions of the shaft 36 and are adjustably attached at their forward ends to the upper portions of the bars 44. The said bars 44 are provided at their upper ends with perforations 46, which are adapted to receive pivot bolts 47, whereby connection is effected between the said bars 44 and arms 45. Markers 48 are pivotally connected with the lower ends of the bars 44 and are normally held substantially in alinement with the same by means of springs 49, which bear at their upper portions against the lower portions of the said bar 44, and at their lower portions against the said markers 48, and at intermediate points are coiled about the pivot bolts of the said markers 48 as at 50.

The markers 48 are located behind the wheels 16 and when the bars 44 are moved in a downward direction, as will hereinafter appear, the said markers 48 will engage the ground in the paths made by the said wheels 16, and, by reason of the fact that the said markers are resiliently supported at the lower ends of the bars 44, the said markers may swing rearwardly in case they should encounter obstructions. Rods 51 are connected at their forward ends with the end portions of the frame 8 and extend back under the frame 1. At their rear portions said bars 51 are bent downwardly as at 52 and terminate in outward projections 53, which are located behind the rear end of the frame 1. Clips 54 are fixed to the side bars of the rear portion of the frame 1, and are provided at their lower ends with inturned portions 55. Hangers 56 pass vertically through the clips 54, and are guided by the inturned portions 55 thereof. Each hanger 56 is provided at its upper portion with a series of perforations 57, and bolts or other securing devices 58 are adapted to enter the said perforations 57 and adjustably secure the hangers 56 with relation to the frame 1 and the clips 54. Each hanger 56 is provided at its lower end with a vertically disposed loop 59, and the said loop 59 receives the rear portions of the rods 51. The distance from the markers 48 to the outwardly disposed rear extremities 53 of the rods 51 is equal to the distance between the hills of grain when the implement is operating as a check-row planter, as will be hereinafter described. Consequently, when an operator sees that the laterally disposed extremities 53 of the rods 51 are over or in alinement with planted rows of grain, he knows that the parts should be so positioned, (which may be accomplished as hereinafter described) that the markers 48 are inserted in the soil. It is to be understood that when the said markers are inserted in the soil the implement simultaneously drops grain in the furrows opened by the shoes 15. Therefore, it will be seen that means is provided for accurately starting the planting operation of the implement.

Each of the seed-boxes 13′ is provided with a discharge outlet 60, which communicates with the upper end of that chute 14′ located under the respective seed-box. Sliding valves 61 are arranged at the upper end of the chute 14′ and hinged valves 62 are arranged at the lower ends of the said chutes. Rocker arms 63 are fixed to the shaft 17, and the upper ends of the rocker arms 63 are connected by means of links 64 with the rear ends of the valves 61. The lower ends of the rocker arms 63 are connected by means of links 65 with the projected ends of the hinged valves 62. Thus it will be seen that as the shaft 17 partially rotates (as will be hereinafter described) the disks 23 are partially rotated through the instrumentality of the bars 20 and their attachments and the arms 19. Thus the seed is passed from the boxes 13' into the openings 60 and upon the valves 61. At the same time the said valves are moved rearwardly and the seed is permitted to fall into the chutes 14'. During the passage of the seed along the chutes 14' sufficient time elapses to permit the shaft 17 and its attachments to assume normal position, and consequently the swinging valves 62 are closed when the seed comes in contact with the same. However, upon the next operation of the shaft 17, the seed previously deposited upon the valves 62 is permitted to escape by reason of the fact that the said valves swing in the lower portions of the chutes 14' and the seed falls behind the shoes 15 into the furrows opened thereby and is closed by soil which is pressed down by the following traction wheels 3 in the usual manner.

By reason of the arms 38 and 37 attached to the shafts 17 and 36 respectively, and the connecting rods 39, the shaft 36 partially rotates simultaneously with the shaft 17, and, consequently, at that time the seed is permitted to fall from the valves 62 the markers 48 project down into the soil in the paths of the wheels 16, and make visible incisions in the said paths at points in transverse alinement with those points at which the seed is deposited in the soil. The seed-boxes 13' are provided in their bottoms with spring-pressed brushes 66, of the usual pattern, which prevent an excess of seed from entering any one of the perforations 23' in the disks 23 in the seed-boxes. The said brushes 66 operate to prevent obstructions which the seed might contain from interfering with the proper separation of the seed and operation of the disks in the boxes.

A cross-bar 67 forms a component part of the frame 8 and lies transversely across the side bars of the frame 1. Blocks 68 are attached to the ends of the cross-bar 67 and are provided in their sides with grooves 69, which receive the side bars of the frame 1. The said blocks are also provided in their inner sides with vertically disposed grooves 70, which slidably receive the chutes 14'. A shaft 71 is journaled upon the cross-bar 67, and is provided with upwardly and rearwardly disposed ends 72. Links 73 pivotally connect the upwardly and rearwardly disposed end extremities 72 of the shaft 71 with the intermediate portion of the frame 8. A rearwardly disposed bar 74 is mounted at its forward end upon an upright 75, carried by the cross-bar 67. The said bar 74 extends back and passes between rollers 76 mounted upon an upright 77 carried by the frame 1. The said bars 74 may move longitudinally between the rollers 76 which act as guides and friction rollers. An upright 78 is mounted upon the bar 74, and a lever 79 is fulcrumed to the upright 78. A link 80 connects the working end of the lever 79 with one of the upwardly and rearwardly disposed ends 72 of the shaft 71 at the point where it pivotally joins with its attached link 73. A segment 81 is also mounted upon the bars 74 and is provided with a series of teeth 82. A spring-actuated pawl 83 is carried by the lever 79 and is adapted to engage the teeth 82 of the segment 81. A stop 84 is adjustably mounted upon the segment 81, and is adapted to limit the swinging movement of the lever 79 with relation to the said segment. By this arrangement it will be seen that, by swinging the lever 79 upon the uprights 78, the major portion of the frame 8 will be raised or lowered with relation to the main frame 1, and thus means is provided for raising or lowering the seed-boxes 13' and their attachments, and for securing the same in adjusted position. As heretofore indicated, during the vertical relative movement of the seed-boxes 13' and their attachments, the chutes 14' move vertically in the grooves 70 provided in the blocks 68. Furthermore, it will be seen that by swinging the lever 12 upon its fulcrum, as heretofore indicated, the bars 9 will be moved longitudinally, and thus the blocks 68 and their attachments will be adjusted along the main frame 1. During such adjustment the side members of the frame 1 remain relatively stationary, and said blocks 68 move along the said frame by reason of the sliding connection established between the blocks and the main frame 1 by the approximately horizontal grooves 69 which receive the side members of the said frame 1. By providing means for shifting the frame 8 and its attachments longitudinally along the frame 1, it will be understood that the said frame 8 and its attachments may be so positioned as to cause the seed to be dropped at desired points from the delivery ends of the chutes 14'. This adjustment is convenient when the planting operation is begun, for it enables the operator to so position the seed separating and dropping mechanism upon the main frame of the implement in a simple and an effective manner to approximately accomplish accurate seed-dropping. The minor adjustment or regulation of the seed-dropping mechanism may be accomplished by other means, as will be hereinafter explained.

Upwardly and rearwardly disposed arms 85 are carried by the secondary frame 8, and a sprocket wheel 86 is journaled between the said arms 85. Guide wheels 87 and 88 are journaled upon the main frame 1, and a sprocket wheel 89 is mounted upon the shaft 2. A rocker arm 90 is journaled upon the main frame 1, and an idle wheel 91 is journaled upon the said rocker arm 90. The wheel 91 bears against the upper side of the upper run of a sprocket chain 92, which passes around the sprocket wheel 89 and under the wheels 87 and 88 and around the sprocket wheel 86.

That end of the rocker arm 90 opposite the end thereof upon which the wheel 91 is journaled is pivotally connected by means of a link 93 with one of the bars 9 of the secondary frame. A second rocker arm 94 is journaled upon the main frame 1, and an idle sprocket wheel 95 is journaled upon the said rocker arm. The wheel 95 bears against the under side of the upper run of the sprocket chain 92. That end of the rocker arm 94, opposite the end thereof which carries the wheel 95 is pivotally connected by means of a link 96 with the rearwardly disposed bars 9 other than that bar with which the link 93 connects. An arm 96' is loosely pivoted upon the main frame 1, and a weighted roller 97 is journaled at the rear end of the said arm 96. The said roller 97 bears against the upper side of the lower run of the chain 92.

Inasmuch as the sprocket wheel 86 is carried by the movable frame 8, and the sprocket wheel 89 is carried by the main frame 1, it will be seen that provision must be made for taking up the slack in the chain 92 when the wheel 86 is moved with relation to the wheel 89. The mechanism last above described is designed for this purpose, and it will be seen that as the bars 9 move longitudinally with the secondary frame 8, the rocker arms 90 and 94 will be swung, so that the wheels 91 and 95 carried by the said arms respectively will move along the upper run of the chain 92 and distort the said run to such an angle as to absorb most of the slack of the said chain. Any slack that should remain is taken from the chain by reason of the weighted wheel or roller or tappet 97 bearing against the lower run of the said chain.

Rollers 98 are mounted at desired intervals upon one side of the wheels 86, and a curved arm 99 has one end disposed in the path of movement of the said rollers 98. The other end of the said arm 99 is fixed to the shaft 17.

An arm 100 depends from the shaft 17, and a coil spring 101 is fixed at one end to the lower end of the said arm 100, and at its other end to the secondary frame 8. The spring 101 is under tension with a tendency to hold the lower end of the arm 100 toward the said frame 8. A stop arm 102 is also fixed to the shaft 17, and when the said shaft is in its normal position the lower extremity of the arm 102 bears against the side of the frame 8. Thus it will be seen that means is provided for partially rotating the shaft 17 as the wheel 86 rotates, and that the tension of the spring 101 causes the shaft 17 and its attachments to assume their normal position when the ends of the tappets 99 escape the rollers 98 successively. When the implement is used for check-row planting but four rollers 98 are mounted upon the wheel 86, and the said rollers are located at equal distances apart. When, however, the implement is used for planting, and it is intended that no attention shall be paid to the check-row feature, more or less of the rollers 98 may be used as occasion may require or conditions indicate.

The sprocket wheel 89 is mounted upon a clutch hub 103, and a sprocket wheel 104 is also mounted upon the said hub. The sprocket wheel 104 has greater diameter than the sprocket wheel 89. The hub 103 is provided in one end portion with an annular groove 105. A lever 106 is fulcrumed to an arm 107, carried by the main frame 1, and is provided with a bifurcated end 108 which lies in the groove 105 of the hub 103. One end of the clutch hub 103 is normally in engagement with a clutch member 109 which is fixed to the axle shaft 2. The said clutch hub 103 is held in this position by means of a coil spring 110 which surrounds the axle-shaft 2, and bears at one end against the opposite end of the clutch hub 103 from that which engages the clutch member 109, and at its other end bears against a clutch member 111, journaled upon the axle-shaft 2. A sprocket wheel 112 (indicated in Fig. 3) is concentrically mounted upon the clutch member 111, and a sprocket wheel 113 is mounted in the upper portion of a bracket 114, (see Fig. 1), which, in turn, is mounted upon the main frame 1. A sprocket chain 115 passes around the sprocket wheels 112 and 113. The upper sprocket wheel 113 is provided with a crank-handle 116, whereby the said sprocket wheel may be rotated upon its axis. Thus it will be seen that by swinging the lever 106 so that the clutch hub 103 will be brought into engagement with the clutch member 111, and then, by rotating the sprocket wheel 113 by using the crank-handle 116, an operator may cause the sprocket chain 92 to move whereby the sprocket wheel 86 will be rotated and the rollers 98 carried around and brought into engagement with the free end of the arm 99, so that the valves 62 in the lower ends of the chutes 14' may be caused to drop the seed at any desired time. After the minor adjustment of the dropping mechanism and the actuating means therefor has been accomplished, it is apparent that the implement may be drawn along the surface of the ground and the succeeding deposits of seed will occur in check-row with seeds deposited in other rows previously. Thus provision is made for major and minor adjustment of the parts of the implement whereby the check-row alinement of the planting operation may be maintained to a nicety.

It frequently happens that during the operation of planting the operation is interrupted by reason of a rainfall which has a tendency to obliterate the previous incisions made in the soil by the markers 48, and, consequently, when subsequent planting is taken up, it is with much difficulty that the exact location of the previous deposits of seed are ascertained. In order to overcome this objection and to render it easy to determine the location of previously planted seed, the present implement is provided with a bracket 117, which carries a number of pegs 118. Thus, when the planting operation has been interrupted and it is desired to exercise the precaution to establish, definitely, the location of seed deposits in the ground, the operator will take the several pegs 118 and drive them in the ground adjacent the deposits of seed. Thus subsequent rains cannot destroy indications of the location of the seed, while they might obliterate the incisions made by the marker.

Having described my invention, what I claim as new, and desire to secure, by Letters Patent, is:—

1. A planter comprising a wheel-mounted main frame, a secondary frame adjustably located thereon, means for adjusting the said secondary frame longitudinally of the main frame, means for adjusting the said secondary frame vertically with relation to the main frame, seed-dropping mechanism carried by the secondary frame, and means for operating the seed-dropping mechanism from the supporting wheels of the main frame.

2. A planter comprising a wheel-mounted main frame, a secondary frame adjustably mounted thereon, means mounted upon the main frame for adjusting the secondary frame, path-forming wheels carried by the secondary frame, markers carried by the secondary frame and adapted to operate in the paths made by the path-forming wheels, a seed-dropping mechanism carried by the secondary frame, and means for operating the seed-dropping mechanism and the markers from the supporting wheel of the main frame.

3. A planter comprising a wheel-mounted main frame, a secondary frame adjustably mounted thereon, means carried by the main frame for adjusting the secondary frame, path-forming wheels carried by the secondary frame and adjustably mounted thereon, markers carried by the main frame and adapted to operate in the paths produced by the path-forming wheels, a seed-dropping mechanism carried by the secondary frame, and means to operate the seed-dropping mechanism and the markers from the supporting wheels of the main frame.

4. A planter comprising a wheel-mounted main frame, a secondary frame adjustably mounted thereon, means carried by the main frame for adjusting the secondary frame, path-forming wheels carried by the secondary frame, markers adjustably mounted upon the secondary frame and adapted to operate in the paths produced by the path-forming wheels, a seed-dropping mechanism carried by the secondary frame, and means for operating the seed-dropping mechanism and the markers from the supporting wheels of the main frame.

5. A planter comprising a wheel-mounted main frame, blocks slidably mounted upon the main frame, means for adjusting said blocks along the main frame, a secondary frame slidably mounted in the blocks, means for adjusting the secondary frame vertically in the blocks, a seed-dropping mechanism carried by the secondary frame and means to operate the seed-dropping mechanism from the supporting wheels of the main frame.

6. A planter comprising a wheel-mounted main frame, blocks slidably mounted upon the main frame, means for adjusting the blocks along the main frame, a secondary frame slidably mounted in the blocks, means for adjusting the secondary frame vertically in the blocks, path-forming wheels carried by the secondary frame, markers carried by the secondary frame and adapted to operate in paths produced by the said path-forming wheels, a seed-dropping mechanism carried by the secondary frame, and means to operate the seed-dropping mechanism and the markers from the supporting wheels of the main frame.

7. A planter comprising a wheel-supported main frame, a secondary frame adjustably mounted thereon, means carried by the main frame for adjusting the secondary frame, a seed-dropping mechanism carried by the secondary frame, a shaft journaled upon the secondary frame and operatively connected with the seed-dropping mechanism, a tappet attached to the said shaft, a wheel journaled for rotation upon the secondary frame and having lateral projections, the said tappet lying in the path of movement of the said projections, a sprocket wheel mounted upon the main frame and operatively connected with the supporting wheels thereof, a chain passing around said sprocket wheels, and a slack-absorbing mechanism mounted upon the main frame and operating against said chain to relieve the same of slack irrespective of the relative position of the secondary frame upon the main frame.

8. A planter comprising a wheel-supported main frame, a secondary frame adjustably mounted thereon, means mounted upon the main frame for adjusting the position of the secondary frame, a seed-dropping mechanism mounted upon the secondary frame, a shaft journaled upon the secondary frame and operatively connected with the seed-dropping mechanism, a sprocket wheel journaled upon the secondary frame and having a series of lateral projections, a tappet attached to said shaft and lying in the path of movement of the said projections, a sprocket wheel journaled upon the main frame and operatively connected with the supporting wheels thereof, a chain passing around said sprocket wheels, rocker arms journaled upon the main frame and carrying wheels which engage the opposite sides of said chain, and means operatively connecting the said rocker arms with the secondary frame.

9. A planter comprising a wheel-mounted main frame, a secondary frame adjustably mounted on the main frame, means mounted upon the main frame for adjusting the position of the secondary frame, a seed-dropping mechanism carried by the secondary frame, a shaft journaled upon the secondary frame and operatively connected with the seed-dropping mechanism, a sprocket wheel journaled upon the secondary frame and having laterally disposed projections, a tappet carried by said shaft and having an end portion lying in the path of movement of the projections of the sprocket wheel, a sprocket wheel operatively connected with the supporting wheels of the main frame, a sprocket chain passing around said sprocket wheel, rocker arms journaled upon the main frame, sprocket wheels carried by the rocker arms and engaging the opposite sides of the said chain, means operatively connecting the said rocker arms with the secondary frame, and a relatively heavy wheel pivotally connected with one of the frames and lying upon one run of the said chain.

10. A planter comprising a wheel-mounted frame, a secondary frame adjustably mounted thereon, a seed-dropping mechanism carried by the secondary frame, a marker carried by the secondary frame, means to operate the seed-dropping mechanism and the marker from the supporting wheels of the main frame, a rod attached to the secondary frame and slidingly supported from the main frame and having an outstanding portion located from one of the seed dropping mechanisms a distance equal to the distance between deposits of seed made by the said seed-dropping mechanism.

11. A planter comprising a wheel-mounted main frame, a secondary frame adjustably mounted thereon, means mounted upon the main frame for adjusting the position of the secondary frame, a seed-dropping mechanism carried by the secondary frame, a sprocket wheel journaled upon the secondary frame and operatively connected with the seed-dropping mechanism, a sprocket wheel mounted upon the main frame, a sprocket chain passing around said sprocket wheel, means mounted upon the main frame and normally holding the sprocket wheel mounted upon the main frame in operative connection with the supporting wheels of the main frame, a lever mechanism mounted upon the main frame and adapted to be operated to give the connection between the said sprocket wheel upon the main frame and the supporting wheels thereof, and means for rotating the said sprocket wheel manually whereby, through the connecting operative parts, the operation of the seed-dropping mechanism carried by the secondary frame may be advanced to accomplish check-row planting.

In testimony that I claim the foregoing as my own I have hereto affixed my signature in the presence of two witnesses.

JOSEPH STICKLEY.

Witnesses:
HARRY DETTMAN,
W. M. WILEY.